UNITED STATES PATENT OFFICE.

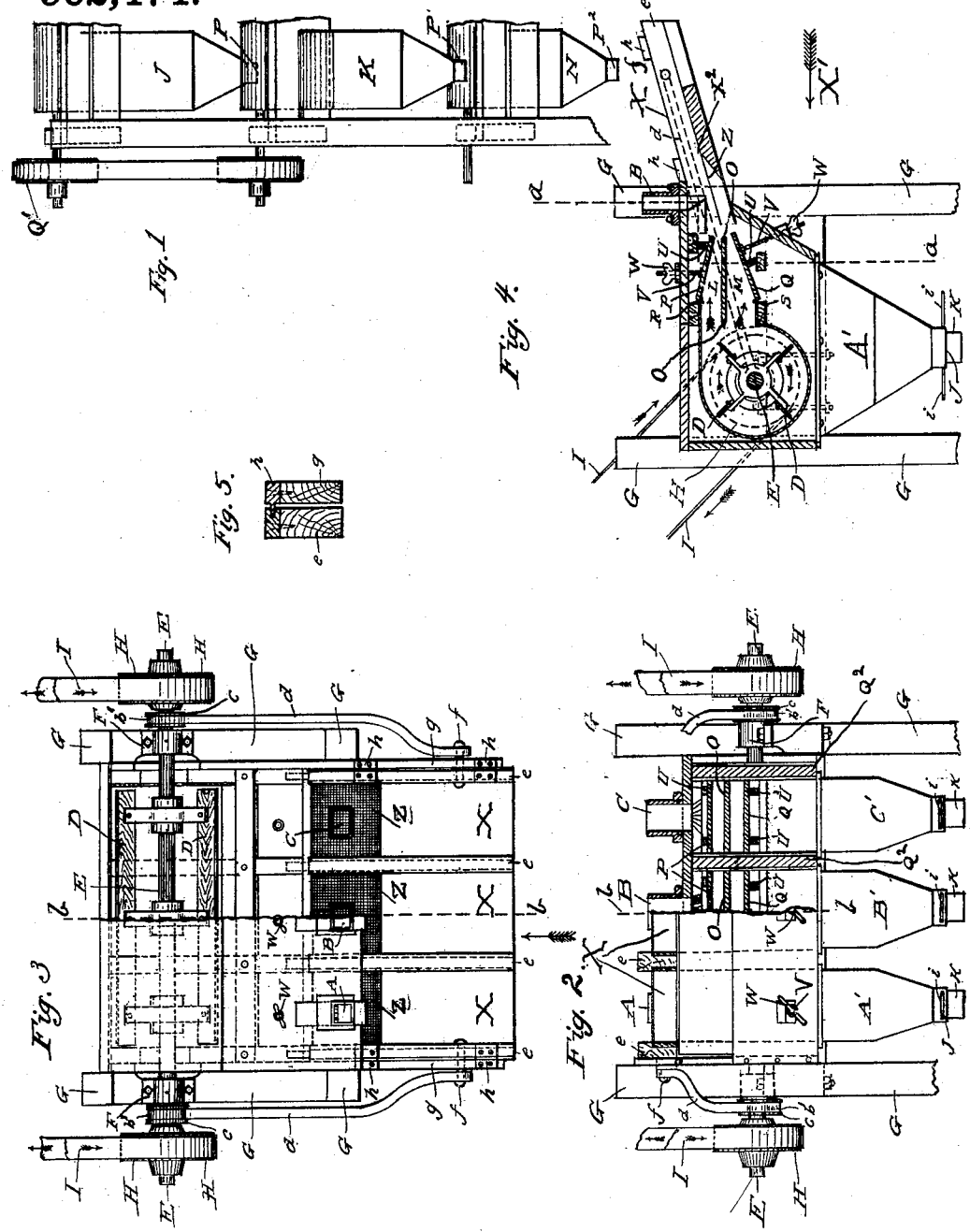

FRANK CONNER, OF LOS ANGELES, CALIFORNIA.

MECHANISM FOR CLEANING AND FINISHING GROUND COFFEE AFTER THE SAME HAS BEEN GRADED.

No. 902,474.  Specification of Letters Patent.  Patented Oct. 27, 1908.

Application filed November 20, 1906. Serial No. 344,341.

*To all whom it may concern:*

Be it known that I, FRANK CONNER, of the city of Los Angeles, in the county of Los Angeles and State of California, have invented certain Improvements in Mechanism for Cleaning and Finishing Ground Coffee After the Same Has Been Graded, of which the following is a full, clear, and exact specification, reference being had to the annexed drawings and to the figures and letters marked thereon.

My said invention which relates to improvements in mechanism for cleaning and finishing ground coffee after the same has been graded, is a further development of, or addition to the mechanism for grading ground coffee, and other substances, for which Letters Patent have been issued to me on the 6th day of November 1906, No. 835,057, and the object of my present improvements is to remove from the graded ground coffee further impure matter such as pieces of husk and extraneous dust or dirt which becomes commingled with the coffee in the act of its being ground and graded, and is not separated therefrom by the machine for which Letters Patent have been allowed to me, upon the date and serial number aforesaid.

In the machine for which Letters Patent have been allowed to me, the graded coffee is collected in three hoppers, and in three different degrees or grades of fineness of the ground material, each hopper being provided with a drawer or door at its bottom, each of which on being opened allows the graded coffee to be discharged from the separate hoppers in which it is contained and removed to wherever required.

The graded coffee discharged from my aforesaid machine, I find in practice, is not perfectly cleansed from husk or other light dusty matter or dirt, and my present invention effects the removing of this light dusty matter or dirt as the graded ground coffee is being discharged from each of the aforesaid three hoppers, which removal I effect by the blowing and separating mechanism constituting my present invention, causing a continuous blast of air to act upon the graded coffee as it is discharged from the machine constituting my former invention, and from the hoppers thereof, into the machine constituting my present invention.

Although I have herein referred only to the three hoppers of the machine shown in the drawings constituting my aforesaid invention, and for which Letters Patent have been allowed to me as aforesaid, I desire it to be understood that my present invention is not necessarily applicable only to my aforesaid machine when made with three hoppers, but it is equally applicable to my aforesaid machine when made with two hoppers, or a larger number than three hoppers for collecting the ground and graded coffee.

Upon the annexed drawings, and with the object of making my present invention and its applicability to my aforesaid invention more clearly understood, I have reproduced in Figure 1, thereof, part of the front elevation corresponding with Fig. 1, of my aforesaid invention. Fig. 2, is in part a rear elevation looked at in the direction of the arrow X', Fig. 4, and in part a vertical section of the mechanism or apparatus constituting my present invention taken upon the line $a$, $a$, Fig. 1. Fig. 3, is in part a plan, and in part a horizontal section, that is to say, having the top removed, and corresponding with Fig. 4. Fig. 4, is a transverse section upon the line $b$, $b$, Figs. 2, and 3; and Fig. 5, is a detail as hereinafter described.

In Fig. 1, the three hoppers respectively marked J, K, and N, correspond with the hoppers similarly marked in Fig. 1, of the drawings of my aforesaid allowed patent, and in the bottom of each hopper J, K, and N, respectively, there is provided a door P, P', and P², which on being opened or drawn out allows the graded coffee in each hopper J, K, and N, to pass through a duct of any required length or shape, not shown in the drawings, but each duct forming a continuous connecting passage between the hoppers J, K, and N, and the receivers A, B, and C, shown at Figs. 2, 3, and 4.

The machine shown by Figs. 2, 3, and 4, of the annexed drawings, consists of a rotating fan D, carried upon a longitudinal driving shaft E, supported rotatively in bearings F, F, at each side or end of the framing G. The shaft E, is provided at each end thereof with a driving pulley H, upon which two driving belts I, are applied for the purpose of rotating the fan D, within the box or casing containing said fan, and the other parts of the mechanism or apparatus hereinafter described.

It is to be understood that although I prefer to use two driving pulleys H, and two corresponding driving belts I, so as to produce regularity of operation of the fan D, and also to prevent stoppage of rotation of the fan when the mechanism is in operation, in the event of one of the belts I, breaking, yet I may operate the blowing fan with one belt I, and driving pulley H, only, and one of the pulleys H, and one of the belts I, may also be used to drive the first motion shaft of the grader at the end of the first motion shaft of the grader opposite to that upon which the pulley Q', is shown situated at Fig. 1.

The arrows in Figs. 2, and 4, indicate the direction of rotation of the blowing fan D, and of the air currents discharged by it into the spaces L, and M, leading into the spaces below the receivers A, B, and C. Horizontal partitions O, extend across each division of the box or casing in which the blowing fan D, is contained. These partitions O, are so situated in relation to the blowing fan D, that the air discharged by the fan passes or blows in two divisions above and below each partition O, respectively. At a short distance both above and below the partitions O, there are suspended or equivalently carried, two adjustable partitions, the upper of which is marked P, and the lower of which is marked Q. These adjustable partitions are attached by hinged connections R, and S, respectively, to the edges of the discharge mouth of the casing of the blowing fan D, and these movable partitions P, and Q, bear against springs U, U, as shown more especially at Figs. 2, and 4, being caused to press against the springs U, U, by means of the screw threaded connecting pins V, V, upon the outer end of which, thumb screw nuts W, W, are carried. It is obvious that by turning the thumb screw nuts W, W, upon the screw threaded connecting pins V, V, that the outer edges of the adjustable partitions P, and Q, may be moved either closer to, or further from the horizontal stationary partitions O, and in this manner the width of the spaces L, and M, at the discharge openings bounded by the several partitions O, P, and Q, and the transverse partitions $Q^2$, are from time to time regulated as required.

At that side of the machine whereat the discharge edges of the partitions O, P, and Q, are situated, there is an inclined vibrating platform X, and as the graded coffee falls into the receivers A, B, and C, from the hoppers J, K, and N, the falling coffee is met by the regulated blast of air generated by the blowing fan D, and passes through the regulated spaces L, and M, of the discharge mouth of the blowing fan beneath the inclined vibrating platform X. As the blast of air in its course passes through and among the graded coffee in its act of falling downwards through the receivers A, B, and C, onto the bottom of the inclined duct $X^2$, the air acts upon the husk, dust or dirty matter which also falls downwards through the receivers A, B, C, simultaneously with the graded coffee, and the blast of air moving in the directions of the arrows shown in Fig. 4 separates the husk and dusty matter from the graded coffee, which is thereby discharged from beneath the inclined vibrating platform X, downwards, upon the screens Z and Z' and from thence into the respective hoppers A', B', and C'.

For the purpose of preventing any waste of the graded coffee, or any collection of the separated chaff and dust by the operation of the blast of air thereon as now last described, the lower end of the bottom of the duct $X^2$, is provided with a screen Z, of sufficient fineness of mesh to allow any of the fine husk, dust or dirt to be blown up through the meshes of the screen by the action of the blowing fan, while preventing the passage through the screen of the graded coffee; and to insure that there shall be no choking of the screen Z, the platforms X, are kept in continuous oscillating movement upon the top of the duct $X^2$, by means of two eccentrics b', b', carried upon the driving shaft E, as shown at Figs. 2, and 3, more especially. The eccentrics b', b', are embraced by the loops c, c, of the eccentric rods d, d, the outer and upper ends of which are fastened to the two sides e, e, of the vibrating platform X, by means of the pins f, f. The edges of the screen frame e, e, are kept within parallel guides g, g, by means of metallic retaining plates h, h, which prevent the rising upwards of the screen frame and screens by any pressure of air blast, while maintaining the screen frame and screen in place with sufficient firmness so as to be easily oscillated by the reciprocating action of the eccentrics b, b. Each of the hoppers A', B', and C', is provided at the bottom thereof with a sliding plate i, in the center of which there is a hole or opening, which when the plates i, i, are in the position shown at Figs. 2, and 4, allow the finally cleansed coffee to pass out from the hoppers A', B', and C', through the hopper mouths k, into any receptacle wherein the finally cleansed coffee is collected.

I claim as my invention.

In a machine for finally cleansing pulverized seeds, the combination consisting of receivers, a horizontal stationary partition in each receiver between two movable partitions therein, a blower operating to discharge air between said partitions, the blower, the partition in each receiver above said stationary partition being adjustable, the partition beneath said stationary partition in each receiver being also adjustable, means for adjusting the position of the upper and lower partitions, a screen, a duct, means for driving the fan shaft and fans, said parts being situated beneath the grading parts of the mechanism, hoppers into which the finally pulverized cleansed seeds are received and from which the pulverized cleansed material is withdrawn from time to time, the rapidly oscillating platform connected to and operated by the driving shaft of the fan, and guides for maintaining the oscillating platform in operative support, substantially as set forth.

In testimony whereof, I have hereunto set my hand and seal at the city of Los Angeles aforesaid, in the presence of two subscribing witnesses.

FRANK CONNER. [L. S.]

Witnesses:
 ST. JOHN DAY,
 IDA M. DASKAM.